July 18, 1961
R. A. MADSEN
2,992,685
FASTENER DEVICE
Filed Aug. 14, 1957
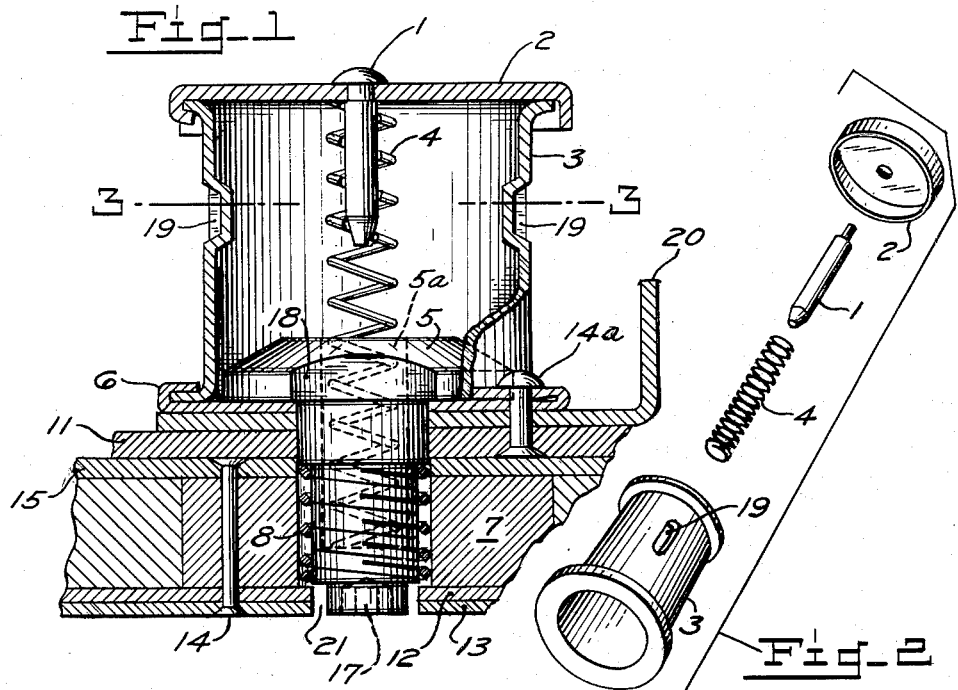
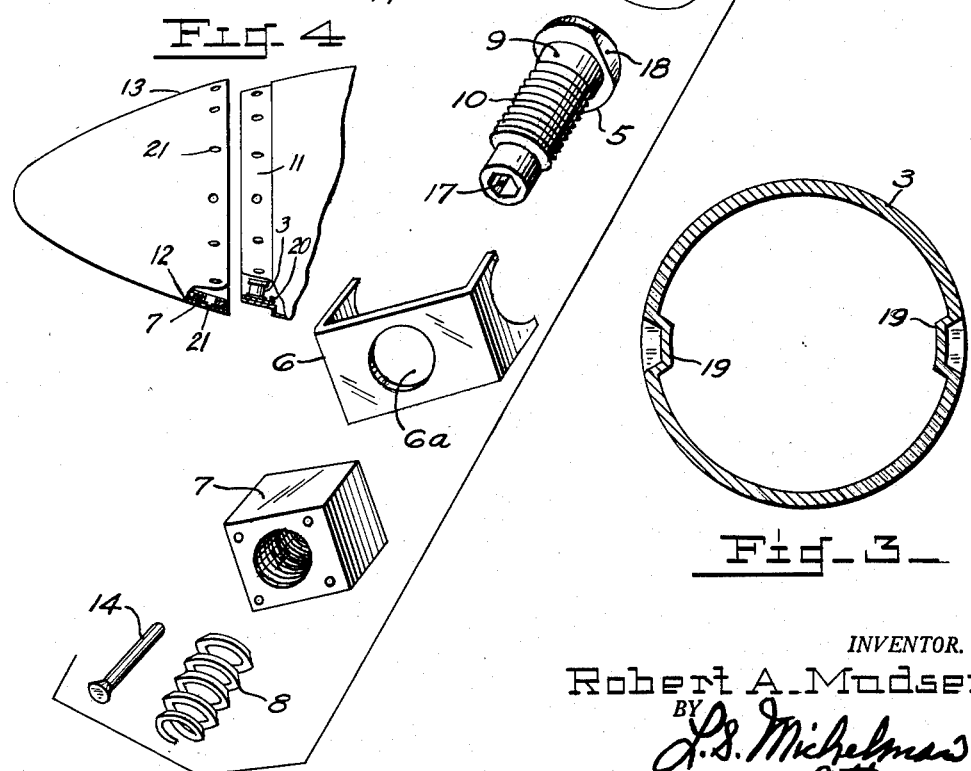
INVENTOR.
Robert A. Madsen ়
United States Patent Office 2,992,685
Patented July 18, 1961

2,992,685
FASTENER DEVICE
Robert A. Madsen, Wethersfield, Conn., assignor to United Aircraft Corporation, East Hartford, Conn., a corporation of Delaware
Filed Aug. 14, 1957, Ser. No. 678,100
10 Claims. (Cl. 170—159)

This invention is concerned with fasteners, particularly fasteners to be used on airplanes.

With the advent of the jet engine and similar types of ingestion power plants that fly or move at unusually high speeds, it has become necessary to redesign various component parts that are used to secure the main assemblies of the unit together. Particularly, this invention applies to fastener having its main purpose for securing a spinner nose assembly of an airplane to the mounting bulkhead and spinner rear nose assembly, featuring a novel arrangement and device that has a positive grip fastening unit which is contained within the spinner skin and is externally accessible.

Spinner assemblies are generally located in front of the turbine engine or the ingestion type engine. The assembly often houses various component parts that operate variable pitch turbine engine propellers. The spinner is so designed that the spinner nose assembly can be easily removed from the spinner rear nose assembly, making it a simple matter to get at the various parts within the spinner.

The method previously employed for fastening the spinner nose assembly was by a conventional nut and bolt affair. The nut usually protrudes externally from the spinner. Accordingly, if the nut becomes loose as a result of vibrations and neglect to keep it properly tightened, the nut and even some of the parts might be ingested into the turbine type engine causing internal damage. With the type of self-contained fastener herein to be described, this type of accident cannot happen. Further, the fastener lends itself to all of the advantages of the bolt and nut arrangement. It might be stated that this invention is concerned with a safety fastener.

Because of the turbulent effect and the increased velocity at which airplanes now fly, the fastener to be used to connect the spinner nose assembly with the spinner rear nose assembly requires that no moving parts may become loose for the reason that they may be ingested into the turbine engine and cause severe damage thereto.

It is therefore an object of the within invention to provide a fastener that will be unable to be ingested into the turbine.

It is still another object of the within invention to provide a fastener for the spinner of an airplane that will not cause turbulent effects.

It is still another object of the within invention to provide a fastener that may be easily engaged and disengaged and still eliminate turbulence and be in a position to prevent ingestion into the turbine of an airplane.

It is still another object of the within invention to provide a fastener that is inexpensive in the cost of manufacture, efficient in operation, simple in structure, and easily utilized by one servicing an airplane.

These and other objects are obtained by the use of a cylindrical enclosed tube that has a bolt under spring tension set therein. The bolt is threaded to a set nut employing a Heli-Coil Midgrip insert. There is a special opening for a specific type of wrench in the bottom of the bolt. The special type of wrench gains admittance through a narrow opening in the spinner so as to engage the bottom of the bolt. The bolt may be turned by the wrench. There are means on the bolt head and in the casing for locking the bolt into a disengaged position. These and other details of the invention may be understood more easily by reference to the following detailed description in which:

FIGURE 1 is a cross-sectional view of the assembly.
FIGURE 2 is an exploded view of the various components shown in perspective that make up the assembly of FIGURE 1.
FIGURE 3 is a sectional view of FIGURE 1 along line 3—3.
FIGURE 4 is a view in elevation of the two spinner sections separated and showing the attaching device of this invention.

A circular tube 3 has mounted around its upper extremity a cap 2. Mounted within the cap 2 is a circular spring guide 1. The spring guide 1 is cylindrical in shape and extends downwardly from the cap 2.

Mounted and circumscribing the spring guide 1 is a spring 4. The spring 4 is directly above the bolt 5. The bolt 5, as shown in FIGURE 1 is in an engaged depressed position. The spring 4 is in contact with bolt 5 and is seated therein in the opening 5a.

At the bottom of the tube 3 is located a seat 6. The edges of the seal 6, as can be seen in the exploded view of FIGURE 2 are pressed down and over the lower flange area of the bottom of the tube 3 as in FIGURE 1. The shank 9 of the bolt 5 extends downwardly through the opening 6a in the seat 6. A thread 10 of the screw 5 engages a Heli-Coil Midgrip insert 8 which is located between the threads of the nut 7 and the thread 10 of the screw 5. As can be seen in the view of FIGURE 1, the Heli-Coil Midgrip insert 8 is a coil spring insert that is readily removable and is particularly adaptable for use with soft metals such as aluminum. The insert 8 acts as a durable thread and at the same time provides tension means whereby the bolt 5 is locked into the nut 7.

There is at the lower end of the bolt 5 an opening or recess which is indicated as 17. This opening is in a special shape to receive a wrench member that may be inserted therein for the purpose of engaging and disengaging the bolt 5 from the nut 7. This will be explained in more detail hereinafter.

There is an opening 21 in the skin and stiffener assembly. The skin portion of the assembly is indicated by the numeral 13 and the stiffener portion is indicated by the numeral 12. These are conventional, of course, in an airplane.

The member 15 is the spinner support ring and is affixed by means of the rivets 14 to the skin 13 and stiffener 12. The bulkhead 11 is proximate the spinner beam 20. The bulkhead 11, the spinner beam 20, and the seat 6 are secured to each other by means of the rivet 14a.

On the tube 3 is a detent 19. On the bolt head 5 is a flat periphery 18. There is a flat periphery 18 on each side of the bolt 5. There is also a detent 19 on each side of the tube 3.

In operation or by way of connecting up the bolt 5 with the fixed nut 7, it is merely necessary to take a wrench which has a head that is adaptable to fit into the opening at the bottom of the bolt, said opening being indicated by the numeral 17. There is available on the market a particular wrench known as the Allen socket wrench. The drawings indicate the use of an Allen socket-type opening for receiving an Allen socket wrench. The bolt 5, generally, when disengaged is pushed up into the tube 3 so that a quarter turn of the bolt by the socket wrench will have the head of the bolt 5 extending over the detents 19 in the tube 3. In order to get the bolt to drop down under the tension of the spring 4, a quarter turn of the bolt by means of the socket wrench will place the flat periphery 18 proximate the detents 19 and permit the head of the bolt 5 to pass down below the detents 19 and engage under spring tension the fixed nut 7. The socket wrench is then turned and engages the insert 8 which is within the nut 7 until the bolt 5 has been completely turned and in tight contact engagement with the threads of the Heli-Coil Midgrip insert 8 which are, of course, also in tight contact engagement with the threads of the nut 7.

When it is desired that the spinner be removed, the bolt 5 must be in a retracted position above the detents 19 in the tube 3. When the bolt 5 is in the retracted position, it is not in engagement with the nut 7, and the parts held together by the rivet 14 as one unit, so to speak, is disengaged from those parts held together by the rivet 14a as another assembled unit, so to speak.

The outer surface of the bolt 5, when it is in engagement with the fixed nut 7 and is securing the skin 13 to the bulkhead 11, is substantially flush with the outer surface of the skin 13. The outer surface of the skin 13 is thus uninterrupted except for the opening 17 for receiving the wrench as well as the slight opening 21. Actually, the bolt 5 fills up the opening 21 almost fully. The drawing is exaggerated to point up the details more clearly.

It is customary that the entire spinner assembly consisting of the skin 13, the stiffener 12, and the support ring 15, rotates, causing a centrifugal action on the bolt 5. This force tends to move the bolt 5 outwardly toward the spinner and retains the bolt 5 in tight engagement with the threads of the Heli-Coil Midgrip 8, preventing bolt 5 from becoming loose.

Details and modifications of the construction insofar as the use of various equivalents is contemplated, and within the spirit and scope of the invention.

Certain dimensions in the drawings have been somewhat exaggerated to teach more clearly the within invention.

I claim:

1. A fastener assembly comprising a tube having detents therein, a spring means mounted therein, a bolt having a head flange within said tube and in contact with said spring, said head flange having two slotted opposite sides, an opening in the bottom of said tube, a predetermined geometrically shaped recess in the bottom of said bolt, threads on said bolt and extending through said opening, a nut adapted for connection with said threads on the bolt, means for holding said nut in an immovable position beneath the tube and bolt and the belt turned by a tool which is in engagement with said recess for securing the connection of the bolt with the nut by permitting said bolt head to drop below said detents.

2. A fastener assembly comprising a closed tube having detents therein, a spring means mounted from the top of said tube and therein, a bolt within said tube, said bolt having a head flange, said flange having flat opposite edges, threads, and a recess in its bottom, said recess being adapted to receive a tool, said bolt being in contact with said spring and under the influence of it, an opening in the bottom of said tube, said spring forcing said bolt through the said opening, a nut, means for holding said nut in a fixed position beneath said tube and bolt, whereby when a tool is passed through said nut and makes engagement with said recess, the rotating of said tool will make threaded engagement with said nut by permitting said bolt head to drop below said detents.

3. A fastener assembly comprising a closed tube, a spring means mounted therein, a detent in said tube and on each side thereof and located near the top thereof, a bolt within the said tube and beneath the said spring means, said bolt having a head, threads, and a recess in its bottom, said head having a flat periphery on each side thereof, said head being normally located above the said detents, an opening in the bottom of said tube, a nut located beneath said tube, means for holding said nut immovable and in a fixed and rigid position beneath said tube and said bolt whereby when a tool adapted to fit within said recess is passed through said nut and into said opening so as to make engagement with said recess in said bolt, a quarter turn of said tool will permit said head to pass below said detents under the pressure of said spring means so that said bolt will pass through said opening and whereby the further turning of said tool will make threaded engagement between said bolt and said nut.

4. A fastener assembly comprising a closed cylindrical tube, a spring, a spring guide mounted within said tube from the top thereof, said spring circumscribing said spring guide, a detent on each side of said tube and extending inwardly, a bolt within said tube, said bolt having two flat edges on the periphery of its head, said bolt being normally in a position whereby its head is above said detents, an opening in the bottom of said tube, said bolt having a threaded shank portion below its head, a predetermined geometrically shaped recess in the bottom of said bolt adapted to receive a particular type of tool, a nut having threads therein adapted to engage the threads on said bolt, said nut being located below said tube, means for holding said nut in a fixed and stationary position below said bolt and said tube, whereby when said particular type of tool is passed through said nut and through said opening so as to make engagement with said recess, a quarter turn of said tool will locate the flat edges of the periphery of the head proximate the said detents in said tube, so that the spring will force the bolt past the said detents and through said opening in said tube so as to contact the said nut; and whereby when said tool is rotated, the bolt will rotate and its threads will engage the threads of said nut and said nut will be secured to said bolt.

5. A fastener assembly adapted to secure the spinner assembly of an airplane to the bulkhead comprising a closed tube, a spring means mounted therein, a bolt within said tube, said bolt having a head in contact with said spring, a predetermined geometrically shaped recess in the bottom of said bolt, said recess being adapted to receive a tool, threads on said bolt, an opening on the bottom of said tube, said threads extending through said opening in said tube, a nut located rigidly within and between the spinner skin-stiffener and the support ring of the spinner and proximate the opening in said tube, an opening in said skin-stiffener opposite the opening in said nut whereby when a tool passes through said opening in said skin-stiffener and through said nut and through said opening in said tube so as to engage the said recess in said bolt, the rotation of said tool will cause the threads of said bolt to engage with said nut so as to fasten the bulkhead and skin-stiffener assembly with the said bolt.

6. A fastener assembly adapted to secure the spinner nose assembly of an airplane to a bulkhead comprising a closed tube, a spring means mounted therein, a bolt within said tube; said bolt having a head, threaded portion, and a recess in the bottom thereof; said recess adapted to receive a tool; an opening in the bottom of said tube, means for securing said tube to said bulkhead, an opening in said bulkhead below said spinner, a nut, means for rigidly mounting said nut in said spinner nose assembly below and proximate the bulkhead, an opening passing through said spinner nose assembly opposite the openings in said nut whereby when a tool passes through the opening in the spinner nose assembly and through the opening in said nut and through the opening in the bulkhead-spinner rear nose assembly and through the opening in said tube, and whereby when the tool engages the recess in the bottom of said bolt, the rotation of the tool will cause the threads on said bolt to engage the threads in said nut whereby the spinner-nose assembly will be permanently secured to the bulkhead.

7. Means for removably securing a spinner to an internal support comprising a bolt, mounting means for said bolt adapted to be located in said support, spring means engaged with said bolt for maintaining a substantial outwardly directed force thereupon, means for releasably engaging said bolt in a depressed position against said spring forces and away from said spinner, a fixed means adapted to be located in said spinner for engaging said bolt, means enabling said bolt to be rotated from outside of said spinner to release said bolt from said restraining means and engage said bolt with said fixed means, whereby said bolt is restrained, and said bolt is substantially flush with the outer surface of said spinner.

8. Means for removably securing a spinner to a support comprising a bolt, mounting means for holding said bolt in an outwardly directed position in said support, spring means in engagement with said bolt whereby said bolt is pushed outward, means for releasably engaging said bolt in a depressed position against said spring means and away from said spinner, a fixed means adapted to be located in said spinner outward of said bolt for engaging said bolt and having an opening adapted to be located therein, an opening in the outer surface of said spinner and aligned with said opening in the fixed means, means enabling said bolt to be rotated from beyond the outer surface of said spinner and pushed outwardly into engagement with said fixed means, whereby the relative positions of the rotatable bolt and the fixed means restrains said bolt in securing position, and said bolt is substantially flush with the outer surface of said spinner.

9. A fastener assembly for two working elements comprising a tube adapted to be carried by one of the working elements, a bolt having a head and threads in said tube, a predetermined geometrically shaped recess in the bottom of said bolt, spring means forcing said bolt threads through an opening in one end of said tube toward the other working element, a nut adapted to be carried by said other working element, means for holding said nut in a fixed position aligned with said tube opening and bolt, whereby when a tool is passed through said nut to engage said recess and when the tool is rotated, said bolt will be urged under the tension of the spring toward, and make threaded engagement with, said nut.

10. Means for removably securing a spinner to an internal support comprising a bolt adapted to be carried in an outwardly directed position by said support and accessible from the outboard end, means urging said bolt outwardly towards said spinner, said bolt adapted to be depressible away from said spinner against the forces of said urging means, means for releasably holding said bolt in depressed position against said urging means for releasing said bolt from said spinner, a nut, means for holding said nut against rotation on said spinner in alignment with said bolt, means releasing said bolt from said holding means and rotating said bolt into threaded engagement with said nut whereby said bolt travels outwardly to secure and lock said spinner to said support with one end of the bolt substantially flush with the spinner outer surface and means including said urging means for restraining said bolt in its securing position.

References Cited in the file of this patent
UNITED STATES PATENTS

| | | |
|---|---|---|
| 639,419 | Manuel | Dec. 19, 1899 |
| 725,662 | Bohlen | Apr. 21, 1903 |
| 1,351,112 | Martin | Aug. 31, 1920 |
| 1,940,084 | Grasso | Dec. 19, 1933 |
| 2,394,749 | Chester | Feb. 12, 1946 |
| 2,563,976 | Torosian | Aug. 14, 1951 |
| 2,831,520 | Clarke | Apr. 22, 1958 |